R. W. WIEDERWAX.
HEATING DEVICE FOR THE WATER CIRCULATION SYSTEMS OF THE ENGINES OF AUTOMOBILES.
APPLICATION FILED FEB. 9, 1920.
1,412,325.
Patented Apr. 11, 1922.
2 SHEETS—SHEET 1.
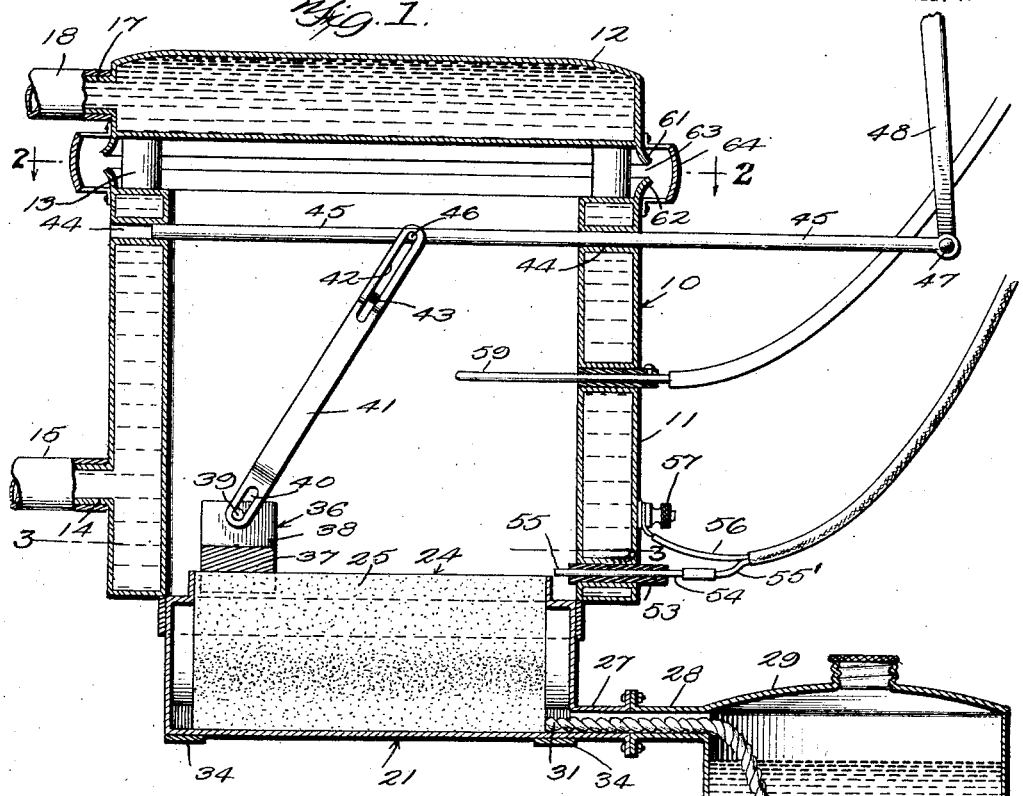
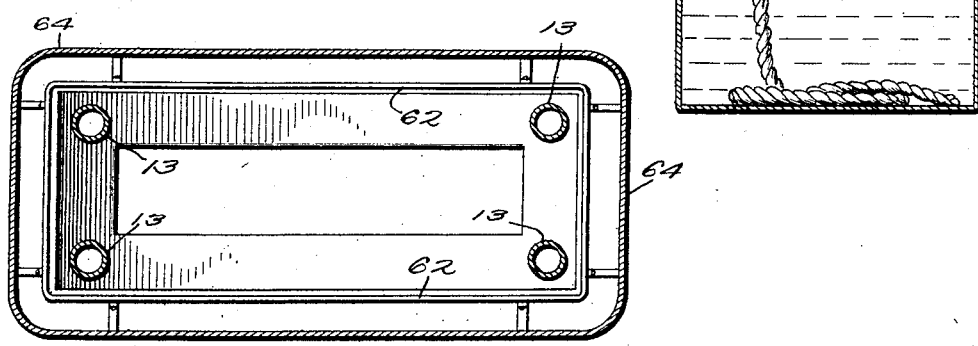
Inventor
Robert W. Wiederwax,
By
Attorney

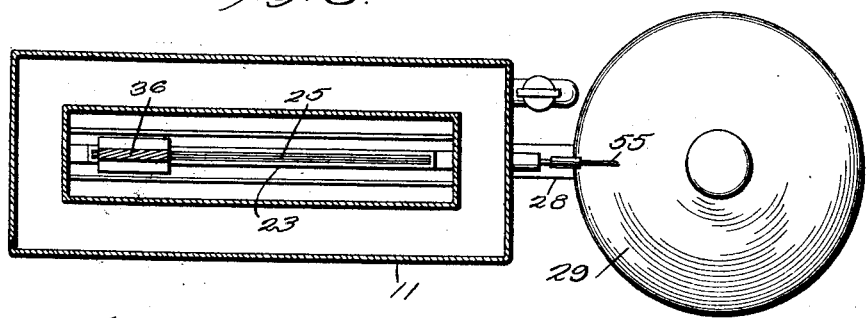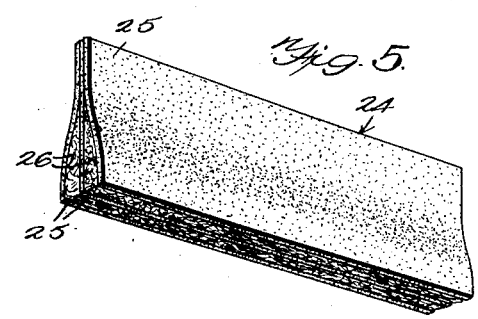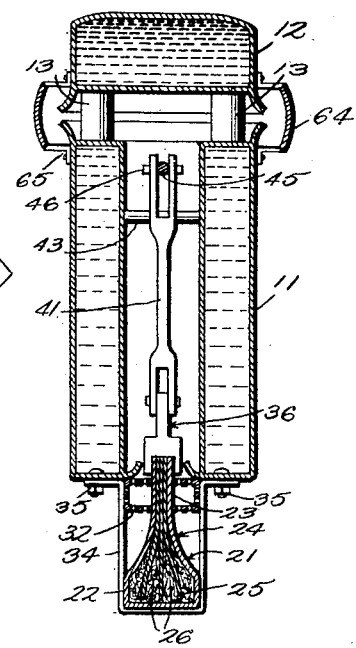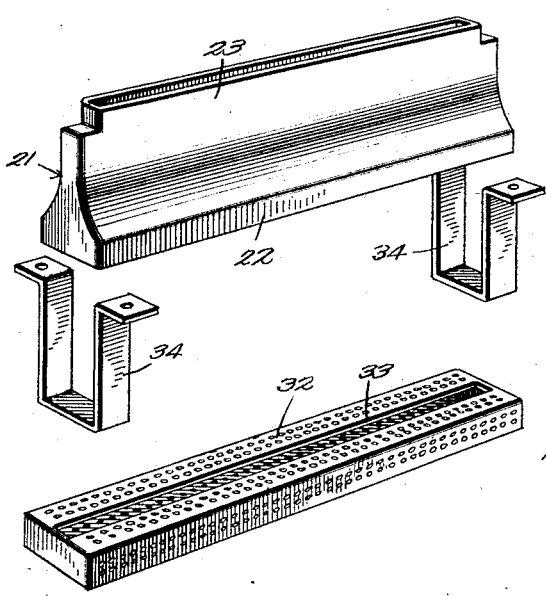

UNITED STATES PATENT OFFICE.

ROBERT W. WIEDERWAX, OF ATLANTIC CITY, NEW JERSEY, ASSIGNOR, BY DIRECT AND MESNE ASSIGNMENTS, TO GEIST MANUFACTURING COMPANY, OF ATLANTIC CITY, NEW JERSEY, A CORPORATION OF DELAWARE.

HEATING DEVICE FOR THE WATER-CIRCULATION SYSTEMS OF THE ENGINES OF AUTOMOBILES.

1,412,325.      Specification of Letters Patent.     Patented Apr. 11, 1922.

Application filed February 9, 1920. Serial No. 357,420.

*To all whom it may concern:*

Be it known that I, ROBERT W. WIEDERWAX, a citizen of the United States, residing at Atlantic City, in the county of Atlantic and State of New Jersey, have invented certain new and useful Improvements in Heating Devices for the Water-Circulation Systems of the Engines of Automobiles, of which the following is a specification.

This invention relates to improvements in heating devices for the water circulation systems of the engines of automobiles and the like.

An important object of the invention is to provide a heating unit for use in connection with an automobile engine which may be readily adapted to all standard makes of automobiles without in any manner altering the construction of the engine.

A further objection of the invention is to provide a heater which will cause the circulation of cooling water not only through the radiator of the engine, but within the engine water chamber.

A further object is to provide a heater of the type described which is so connected with the engine that it will ordinarily cause a circulation of heated water through both the engine waterjacket and the radiator and which will, in event of the cold becoming so severe as to cause freezing of the water in the small tubes of the radiator, continue to supply a circulation of heated water through the waterjacket of the engine.

A further object is to provide a device of the above mentioned character which is readily and cheaply constructed and the parts of which are readily interchangeable in the event of destruction in use.

Other objects and advantages will become apparent throughout the course of the following discussion.

In the accompanying drawings wherein for the purposes of illustration are shown preferred embodiments of my invention, Figure 1 is a longitudinal section taken through my apparatus.

Figure 2 is a section on the line 2—2 of Figure 1.

Figure 3 is a section on the line 3—3 of Figure 1.

Figure 4 is a transverse section taken through my apparatus.

Figure 5 is a combined perspective showing the wick casing and associated parts.

Referring now more particularly to the drawings, the numeral 10 indicates a casing as a whole composed of a body section 11, and a head 12, of double wall construction affording a water chamber. The head 12 is connected with the chamber of the body portion 11 by means of spaced conduits 13.

The body portion 11 is provided with a connection 14 forming an inlet which may be connected by means of a suitable conduit 15 with the water circulation system of the engine preferably at the lowest, or approximately the lowest, point thereof. The head 12 is provided with an outlet 17 which is connected by a conduit 18 with a point adjacent the upper surface of the head of the engine.

It will be obvious that water circulating through the casing is normally caused to pass from practically the entire length of the head of the engine thence through the radiator to its lowermost point where it is again returned to the heater. It will further be obvious that with such circulation, it is impossible for the water in the waterjacket of the engine and practically impossible for that in the radiator to freeze. It will also be noted that in event of freezing of the water in the small pipes of the radiator, thus preventing the circulation therethrough, this circulation will still be complete through the waterjacket of the engine, the inlet pipe thereto, the inlet pipe 15 of the heater, the waterjacket of the heater and outlet pipe 18 connecting the heater and the waterjacket.

A wick casing 21 is provided having a broad rectangular base 22 which tapers upwardly to a narrow top, as at 23. The wick 24 is composed of a plurality of sections of asbestos 25, closely joined at their upper ends and expanded at their lower ends to afford spaces allowing of the insertion of wool 26, or some other substance forming a ready conductor or liquid fuel. This wick closely fits the interior of the wick casing 21. The conduit 27 connects with one end of the wick casing and is connected in turn by means of a coupling with the conduit 28 secured to a reservoir 29. A wick 30 has one end disposed within the reservoir and the other end is contacting the base of the wick 24 as at 31.

The lower end of the body portion 11 of the casing is open. A perforated plate 32 is provided having a central longitudinal slot 33 formed therein, which receives the upper end of the wick casing 21. Straps 34 are employed to hold the wick casing 21 and the plate 32 in position, the straps being secured in position by means of bolts 35 or the like.

Slidably mounted upon the upper surface of the wick casing and wick is a member 36 embodying a bifurcated lower end 37 which straddles the upper end of the wick casing and provides a surface abutting the upper end of the wick. It will be obvious that by shifting the member 36 from one end of the wick to the other, the flame will be extinguished. It will also be obvious that if the member 36 is shifted partially along the wick, as for example, to a point centrally thereof, but one-half of the wick will be burning. In this connection, it is to be noted that as a flame increases in length it also increases in height. The member 36 therefore becomes a flame regulator and extinguisher.

The upper end of the member 36 is reduced as at 38 and has extending therethrough a pin 39. This pin operates in a slot 40 formed in the lower end of the lever 41. The upper end of the lever 41 has formed therein a slot 42 which receives a pin 43 secured to the inner wall of the body portion 11 of the casing. Slidably mounted in apertures 44 formed in the walls of the body portion 11 is a rod 45 provided with a pin 46 which operates within the upper end of the slot 42 formed in the lever 41. It will be obvious that by operating the rod 45, the flame regulator and extinguisher 36 may be shifted longitudinally of the wick, binding of the extinguisher or rod being prevented by the slots in which the pins operate.

In order to provide for ready ignition of the wick, I have mounted in the wall of the casing 11, an insulating member 53, through which extends a conducting contact member 54 having one end arranged in proximity to the adjacent end of the wick casing 21. The conducting member 54 is connected with a suitable wire 55' forming one terminal of a circuit. A wire 56 is provided forming the other terminal of the circuit and is connected to the casing 11, by means of a binding screw 57 or the like. These wires have in circuit therewith any suitable source of electrical current and also have in circuit therewith a suitable switch.

In order that the degree of heat present within the casing may be readily determined, I have provided an aperture in the side wall of the body portion 11, through which extends one end of a pyrometer.

The lower edge of the outer wall of the head 12 is out-turned as at 61 and the upper edge of the outer wall of the body portion is out-turned as at 62, providing between their out-turned edges a gas outlet space 63 through which the products of combustion from the wick may escape. In order to prevent vagrant drafts from entering at the aperture and extinguishing the flame of the wick, I prefer to provide a shield 64 which surrounds the casing 10 at the aperture 63 and is held in spaced relation thereto by means of supporting arms 65, as clearly shown in Figure 4.

The operation of this form of my apparatus is extremely simple and is thought to require no further explanation with the exception of fact that the attention is directed to the plate 32 which prevents back fire which may be caused by the explosion of gaseous fuels commonly present with automobile engines and which may be drawn into the heater by the draught caused by the flame, from communicating their flame to other gaseous fuels without the heater.

As many changes are possible in the shape, size, and relation of the various parts herein shown, I do not limit myself to the specific structure herein before set forth, but may make any such changes without departing from the spirit of the invention, or the scope of the subjoined claims.

What I claim is:

1. A water heater comprising a casing having spaced walls forming a water chamber, the space within the inner walls forming a heating chamber, a burner arranged therein, a water head arranged above and spaced from said heating chamber, the outer wall of said casing and the walls of said head being extended toward each other and spaced to permit passage of heated gases, and connections between said water chamber and said head.

2. A water heater comprising a casing having spaced walls forming a water chamber, the space within the inner walls forming a heating chamber, a burner arranged therein, a water head arranged above and spaced from said water chamber, the outer walls of said casing and the walls of said water head being extended toward each other and outwardly, the adjacent edges being spaced from each other to permit passage of heating gases, and connections between said water head and said water chamber.

3. A water heater comprising a casing having spaced walls forming a water chamber, the space within the inner walls forming a heating chamber, a burner arranged therein, a water head arranged above and spaced from said water chamber, the outer walls of said casing and the walls of said water head being extended toward each other and outwardly, the adjacent edges being spaced from each other to permit passage of heating gases, connections between said water head and said water chamber, and a shield arranged adjacent said extended walls.

In testimony whereof I affix my signature.

ROBERT W. WIEDERWAX.